United States Patent Office 2,856,319
Patented Oct. 14, 1958

2,856,319

SUGAR REFINING WITH MAGNESIUM CARBONATE POLYHYDRATE FROM RECARBONATED DOLOMITE, MAGNESITE AND THE LIKE

Alexander M. Zenzes, New York, N. Y.

No Drawing  Application January 20, 1954
Serial No. 405,251

Claims priority, application Germany May 2, 1953

4 Claims. (Cl. 127—50)

The present invention relates to a process for the purification of cane, beet and sorghum juice and other sugar solutions, including syrups, molasses and the like.

The process is also applicable to the refining of raw sugar, both cane and beet, particularly in combination with the so-called carbonation process.

The process relies upon the use of a reactive form of magnesium-carbonate, preferably obtained by special recarbonation of burnt dolomite, magnesite and the like and the novel method of employing such reactive carbonate in the prescribed manner for the treatment of sugar juices.

The reactive magnesium-carbonate, as made and employed under the specific conditions, shown herein, acts as a carbonating agent upon the juice while simultaneously liberating magnesium-hydroxyde in statu nascendi for purpose of refining.

The term "reactive" magnesium carbonate trihydrate as used hereinafter and in the claims annexed hereto refers to a magnesium carbonate trihydrate which instantaneously releases carbon dioxide on reaction with calcium oxide or hydroxide. Such a reactive magnesium carbonate trihydrate is obtained, as will be described hereinafter, by burning dolomite, magnesite, and the like magnesium carbonate-containing material, slurrying said burnt material with water, and introducing into the slurry carbon dioxide at a temperature below about 60° C. whereby the concentration of the slurry is between about 10% and about 15% of said burnt dolomite, magnesite, and the like.

It will be shown further below that the present process is substantially complementary to lime defecation and is therefore employed in combination with CaO. Raw juices purified in accordance with the present invention show higher purity, better removal of calcium-salts, better filtration and better colour than juices purified in the conventional manner with milk of lime alone.

The powerful purification effect on sugar solutions of MgO, particularly in so-called activiated form, is well known. The prior art has shown the addition of MgO in "activated" form to cane and beet juice.

The refining effect is mostly due to adsorption and surface action and after completion of its work the MgO is usually removed as insoluble salt by the addition of proper acids, for instance phosphoric acid. Experience has shown that the shipment of such activated oxydes to distant sugar factories involves the loss of activity, probably due to absorption of $CO_2$ and $H_2O$ in transit.

To overcome such difficulties, the present invention provides therefore a non-active, substantially inert form of magnesium-oxyde which is converted directly at the sugar factory by simple means and at the available room temperature into a highly reactive form of magnesium-carbonate. Such magnesium-carbonate, preferably of the type $MgCO_3 \cdot 3H_2O$, is added under prescribed conditions to the juice or sugar solution, serving simultaneously as a carbonating agent and refining agent by releasing magnesium-hydroxyde in statu nascendi, that is in the most active form possible.

Magnesium-carbonate has been shown by the prior art as having desirable effects upon juice purification. It will be shown further below that the attempts of the prior art failed to produce the high purification effect of the present invention principally by failing to employ magnesium-carbonate properly and secondly, by failing to provide an economical form of reactive magnesium-carbonate. Even precipitated magnesium-carbonate of highest purity as employed in the pharmaceutical industry does not show the re-activity as the activated tri-hydrate slurry obtained by the recarbonation of dolomite, magnesite and the like as shown further below.

Furthermore, where the prior art shows the use of magnesium-carbonate, even disregarding the requirements of economy and availability, it generally adds the carbonate directly to the raw juice, failing to recognize the complementary character of purification and the reciprocal action with the limed juice which is clearly shown in the present invention as a condition for the proper use of magnesium-carbonate.

I have found that either the penta or the tri-hydrate form of magnesium-carbonate, preferably in the form of an aqueous slurry or suspension, is the preferred form as far as re-activity and economy is concerned.

Neither of these polyhydrates are conveniently available in dry form, but very simple ways and means are shown further below for the making of said tri-hydrate from either dolomite and magnesite. The re-carbonated slurry is used in wet form directly at the sugar factory without further drying operations.

By way of illustration the process may be employed as shown in Example No. 1 in the purification of beet juice.

EXAMPLE NO. 1

*Recarbonated dolomite slurry added to first carbonation juice*

1.5 liter of raw juice of 14° Brix, having a purity of 86° was limed in the conventional manner to pH 12 and subsequently carbonated to pH 10.8.

25 g. of recarbonated dolomite tri-hydrate in the form of a slurry of 60% $H_2O$, made in accordance with Example II were added to the hot carbonated juice prior to filtration. The pH fell instantly from 10.8 to 9.6 due to the carbonating effect of the slurry upon the juice. At the same time a powerful colour-removal was noticeable.

The juice was held at 80° C. for 5 minutes, while agitating to permit the completion of the refining reaction due to the magnesium-hydroxyde precipitation.

At the end of the reaction period sufficient milk of lime was added to raise the pH again to 10.4 causing the dissolved MgO to be thrown out of solution in the form of magnesium-hydroxyde.

The muds now comprise a mixture of first carbonation mud, the muds from the carbonation produced by the magnesium-carbonate, the magnesium-hydroxyde muds and the mud produced by the complementary liming to pH 10.4. All of these combined muds are under the present prescribed conditions irreversible and are removed in one single extremely fast filtration.

Following filtration the juice was subjected to second carbonation in the conventional manner. The results of this treatment are shown in the following Table No. I in comparison with conventional double carbonation without the use of the re-active magnesium-carbonate of the present invention.

TABLE NO. I

|  | conventional double carbonation | processed in accordance with Example No. 1 | improvement, percent |
|---|---|---|---|
| filter coefficient | 7 | 3.5 | 50 |
| extinction of colour | 58 | 22 | 62 |
| Ca salts/100 Bx | 46 | 34 | 26 |
| purity | 88 | 90.5 | 3 |

The entire treatment is accomplished within less than 3–5 minutes due to the fact that the magnesuim-carbonate-trihydrate of the recarbonated dolomite reacts instantly with dissolved lime or lime salts respectively in the juice in accordance with the following:

$$CaO + MgCO_3 \cdot 3H_2O = CaCO_3 + Mg(OH)_2 + H_2O$$

The magnesium-hydroxyde forms in statu nascendi and the powerful refining effect particularly with respect to colour is instantly visible.

A certain amount of MgO is left in solution after the completion of the reaction and is subsequently precipitated by the addition of sufficient complementary milk of lime to raise the pH of the juice to higher than 10, preferably 10.2 to 10.4. It was found that this complementary liming is an important part of the present process and constitutes the reverse of the above re-action:

$$Mg + \text{alkalinity over pH } 10.2 = Mg(OH)_2$$

Where the prior art is attempting to employ magnesium carbonate it does not show the highly-reactive and economical aqueous slurry form which results from the recarbonation of the calcined ore. Nor does the prior art recognize the proper method of using magnesuim carbonate and the beneficial effect of the complementary liming to pH 10 or above.

This is clearly illustrated in the following Table No. II made with raw juice of only 83.8 points of purity and pH 6.5.

TABLE NO. II
[Illustrates differences in purification effect between proper and improper use of magnesium carbonate]

|  | Purity | Colour Extinction | Filter rate | Ca Hardness | grams MgO used per liter | grams CaO used per liter |
|---|---|---|---|---|---|---|
| Magnesium Carbonate added to raw juice | 88.6 | 57.5 | 160 | 60 | 2.4 | 7 |
| Magnesium carbonate added as described in Example No. 1 | 94.7 | 22.1 | 107 | 30 | 0.8 | 7 |

Table No. II shows clearly that notwithstanding a 300% increase in MgO equivalent, the addition of carbonate to the raw juice did not produce the effect which a much smaller amount of MgO produced when added to the juice at pH 10.8 in accordance with the present invention. Evidently, not only the type of magnesium carbonate, but also the proper method of using same is of critical importance.

A similar comparison was established showing the difference in purification effect when using a commercial magnesium carbonate in dry form as compared to the trihydrate form of recarbonated dolomite, magnesite or seawater MgO of the present invention in the form of an aqueous slurry. Here again the slurry of the present invention produced superior results even in comparison to C. P. magnesium carbonate which was increased to three times the MgO equivalent of that used in the aqueous preparation of the present invention made in accordance with Example No. 2.

EXAMPLE NO. 2

*Making of an aqueous slurry of trihydrate recarbonated dolomite*

The raw material for this example consists of 100 g. of a finely ground half burnt dolomite corresponding to the following composition:

71 g. of $CaCO_3$ in fine porous form of large surface
25 g. MgO
4 g. impurities
_____
100 g.

The process may also be carried out with burnt dolomite instead of half burnt dolomite.

100 g. of the half burnt dolomite powder are dispersed in 1.5 liter of water and about 20 liter of $CO_2$ are added in a suitable saturation device. The $CO_2$ is preferably diluted with air in order to correspond as much as possible to the concentration used in sugar factories i. e. about 30% $CO_2$, or it may be diluted to about 12% in order to correspond to the concentration to flue gases which is the preferred source of material contemplated for this purpose.

Care is taken that the temperature of the activation tank remains below 60° C. which may require cooling. After recarbonating about 90% of the original MgO, the resultant slurry contains about 145 g. of total carbonates in substantially equal proportion, expressed in terms of $CaCO_3$ and $MgCO_3$. In other words, the actual weight of solids is considerably higher due to the fact that three molecules of water are combined with the magnesium carbonate phase of the composition. When working at lower temperatures some penta hydrate forms, $MgCO_3 \cdot 5H_2O$, in which event the weight is correspondingly increased.

The recarbonated composition is preferably used in the form of a semi-liquid slurry, having an original content of 10–15% of burnt or half burnt dolomite before recarbonation. Or, the solid phase may be separated from the liquid as shown in Example No. 1, by filtration, yielding a filter cake in the form of a paste of recarbonated dolomite, having about 60% free moisture.

The filtrate, containing dissolved magnesium bicarbonate may be re-cycled for the next recarbonation.

In the recarbonation the following typical reactions are taking place in a system of pure water, it being understood that allowance must be made for the formation of saccharates where sweet water, thin juice or raw juice is employed in lieu of fresh water:

$$MgO + CO_2 + H_2O = Mg(HCO_3)_2$$

By observing a temperature below 60° the dissolved bicarbonate is thrown out of solution in the presence of excess MgO in accordance with the following:

$$Mg(HCO_3)_2 + MgO + 5H_2O = 2MgCO_3 \cdot 3H_2O$$

The tri-hydrate upon being subjected to the heating effect of the hot juice is changed over as follows:

$$5MgCO_3 \cdot 3H_2O \xrightarrow{\text{over } 60° \text{ C.}} 4MgCO_3 \cdot Mg(OH)_2 \cdot 4H_2O + 10H_2O + CO_2$$

It is therefore desirable in the interest of utilizing a maximum of $CO_2$ for carbonation of the juice to keep the temperature of the activated slurry below 60° C., preferably 45 to 50° C. The characteristic pH of the slurry is about pH 8.8.

Aside from chemical control, the proper point of recarbonation is conveniently checked by means of the microscope. By viewing samples of the slurry under the microscope the operator will quickly recognize the characteristic long needles, up to 50 microns, of $MgCO_3 \cdot 3H_2O$, the desired tri-hydrate.

The foregoing example shows the making of the recarbonated reagent from half burnt dolomite. Substantially the same recarbonating treatment may be applied to finely ground calcined dolomite, CaO.MgO, or to hydrated dolomitic lime, preferably having a mol ratio 1:1 or to finely ground magnesite calcined previously between 450–750° C. The process permits the utilization of magnesite containing high percentages of CaO which, after recarbonation to $CaCO_3$, acts as filter aid. The process may also be applied to MgO or $Mg(OH)_2$ derived from seawater where particular economies may be effected by converting the precipitated magnesium hydroxide directly into the form of the magnesium trihydrate or magnesium carbonate polyhydrate slurry.

Seawater MgO, being of high purity, when recarbonated in accordance with Example No. 2 was very viscous above 5% original MgO content. The effect upon first carbonation juice, when added thereto at pH 10.8, was quite powerful and filtration rates were obtained close to 400% over the normal factory filtration rate for conventional first carbonation juice. These filtration rates reached on the Brieghel-Müller scale a filtration coefficient of F. K. 2 and were accompanied by colour improvements of over 100%, higher purity and higher removal of calcium salts. The amount of recarbonated seawater MgO used was 0.1% MgO/liter of first carbonation juice.

Another improvement of the present invention rests in the employment of recarbonated dolomite hydrate. Such a product contains not only the desirable reactive magnesium carbonate but also a highly "active" calcium carbonate as compared to the calcium carbonate phase present in the slurry made from half burnt dolomite.

I prefer to prepare the reactive magnesium carbonate directly at the sugar factory just prior to use, employing $CO_2$ from flue gas for this purpose and sweet water or thin juice in lieu of fresh water, if desired. The resulting slurry may conveniently be used in its totality including the dissolved magnesium bicarbonate present in the liquid phase thereof. Or, the solids may be separated, for instance, by filtration, and may be used in the form of a paste. Or, such a paste may be reduced to dry form by removing the free moisture therefrom. The expression "reactive magnesium carbonate" is used to distinguish the product of the present invention from the conventional form of dry magnesium carbonate. The original ore, including magnesite or dolomite, is for the purposes of this process, practically inert and will not react with the calcium salts or the lime in the sugar juice. Even pure pharmaceutical grade magnesia alba does not react instantly with the CaO in the juice, irrespective of the fact that such a product is not suitable for economical reasons.

The reactive magnesium carbonate of the present invention, preferably in the form of $MgCO_3.3H_2O$ is preferably used in the form of a slurry of 5–15% MgO equivalent and reacts practically instantly if added, in the proper proportion, to prelimed or first carbonation juice at a pH of higher than 10. It will cause an instant drop to a pH of about 9.6 or less within 1 to 2 minutes.

The reactive magnesium carbonate of the present invention may be employed in a number of different ways. If added directly to limed juice at a pH of about 10.8 to 11.2 it has not only a carbonating effect upon the juice, but a refining effect which makes the conventional juice treatment unnecessary.

The juice, after addition of the complementary lime to about pH 10.4 is superior to a juice having had the benefit of complete lime defecation and first carbonation.

The present magnesium carbonate treatment may also be given to the first carbonation juice after filtration. Or, the treatment may be applied at the end of the first carbonation and repeated at the end of the second carbonation before filtration.

The multiple effect of the reactive magnesium carbonate is due to the novel combined action of carbonation with the refining and conditioning action supplied by the $Mg(OH)_2$ liberated during carbonation. Furthermore, the addition of the complementary lime not only removes MgO, but it removes same in the form of $Mg(OH)_2$, thus exercising a further refining action.

All of these reactions are taking place in a short interval of time and bring about higher purification of juice, better sugar and higher sugar recovery.

I have obtained the desired effect by supplying about 0.1% MgO in the form of the recarbonated slurries of the present invention, calculated upon beet. This figure corresponds to about 0.3 to 0.5% half burnt dolomite on beet or about 0.1% calcined magnesite or seawater MgO.

A similar relationship applies to cane juice and correspondingly smaller quantities may be employed when refining raw cane or raw beet sugars.

The process is particularly effective in refractory or frozen juice from beet and cane due to the improved filtration properties which are imparted to the filter cake through the action of the reactive carbonate.

The process makes available to the sugar industry the vast supply of dolomite as economical source of MgO which could not be properly utilised by the methods shown by the prior art.

Dolomite exists practically everywhere in the world where cane or beet is being processed.

The expression "first carbonation" as used herein means the main liming, followed by first gassing to about pH 10.8; the expression second carbonation means second gassing to about pH 8.5 to 9 and the customary treatment.

What I claim is:

1. In a process of purifying a sugar-containing aqueous solution, the steps comprising adding lime to said sugar-containing solution until a pH-value of about 12.0 is attained, introducing carbon dioxide into the limed solution to adjust the pH-value to a value between about 10.0 and 11.2, thereafter adding reactive magnesium carbonate trihydrate until the pH-value is reduced to at least a pH of 9.6, agitating the resulting mixture at a temperature between about 60° C. and about 80° C. until substantial decolorization is effected, and then removing the precipitate formed.

2. In a process of purifying a sugar-containing aqueous solution, the steps comprising adding lime to said sugar-containing solution, until a pH-value of about 12.0 is attained, introducing carbon dioxide into the limed solution to adjust the pH-value to a value between about 10.0 and about 11.2, thereafter adding reactive magnesium carbonate trihydrate until the pH-value is reduced at least to a pH-value of 9.6, agitating the resulting mixture at a temperature between about 60° C. and about 80° C. until substantial decolorization is effected, liming the mixture to increase its pH-value to a value between 10.2 and 10.4 and to precipitate dissolved magnesium ions as magnesium hydroxide, removing the precipitate formed, and carbonating the solution obtained.

3. In a process of purifying a sugar-containing aqueous solution, the steps comprising adding lime to said sugar-containing solution until a pH-value of about 12.0 is attained, introducing carbon dioxide into the limed solution to adjust the pH-value to a value between about 10.0 and about 11.2, removing the precipitate formed, thereafter adding to the remaining solution reactive magnesium carbonate trihydrate until the pH-value is reduced at least to a pH-value of 9.6, agitating the resulting mixture at a temperature between about 60° C. and about 80° C. until substantial decolorization is effected, and then removing the precipitate formed.

4. In a process of purifying a sugar-containing aqueous solution, the steps comprising adding lime to said sugar-containing solution until a pH-value of about 12.0 is attained, introducing carbon dioxide into the limed solution to adjust the pH-value between about 10.0 and about 11.2, removing the precipitate formed, thereafter adding to the remaining solution reactive magnesium carbonate trihydrate until the pH-value is reduced at least to a pH-value of 9.6, agitating the resulting mixture at a tempera- ture between about 60° C. and about 80° C. until substantial decolorization is effected, liming the resulting mixture to increase its pH-value to a value between 10.2 and 10.4 and to precipitate dissolved magnesium ions as magnesium hydroxide, removing the precipitate formed, and carbonating the solution obtained.

References Cited in the file of this patent

UNITED STATES PATENTS

| | | |
|---|---|---|
| 1,573,603 | Grunwald | Feb. 16, 1926 |
| 2,358,818 | Miller | Sept. 26, 1944 |
| 2,422,699 | Naugle | June 24, 1947 |
| 2,441,281 | Naugle | May 1, 1948 |
| 2,449,293 | Gloss | Sept. 14, 1948 |
| 2,515,353 | Naugle | July 18, 1950 |

FOREIGN PATENTS

| | | |
|---|---|---|
| 190 | Great Britain | of 1877 |